(12) United States Patent
Tomuro et al.

(10) Patent No.: US 9,517,552 B2
(45) Date of Patent: Dec. 13, 2016

(54) FILTER REMOVER

(71) Applicant: KOMATSU LTD., Minato-ku, Tokyo (JP)

(72) Inventors: Minato Tomuro, Oyama (JP); Shinya Furuhata, Oyama (JP); Shouhei Nagasaka, Oyama (JP); Kozo Okuda, Hirakata (JP); Osamu Okamoto, Hirakata (JP); Yukinori Maeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/371,430

(22) PCT Filed: Dec. 25, 2013

(86) PCT No.: PCT/JP2013/084761
§ 371 (c)(1),
(2) Date: Jul. 9, 2014

(87) PCT Pub. No.: WO2015/097799
PCT Pub. Date: Jul. 2, 2015

(65) Prior Publication Data
US 2015/0174746 A1 Jun. 25, 2015

(51) Int. Cl.
*B25B 27/00* (2006.01)
*B25B 27/02* (2006.01)

(52) U.S. Cl.
CPC ......... *B25B 27/0042* (2013.01); *B25B 27/023* (2013.01); *Y10T 29/53687* (2015.01)

(58) Field of Classification Search
CPC ... B25B 27/0042; B25B 27/00; B01D 46/008; G21C 19/26; G21C 19/207; B23P 11/005; B23P 11/027; B23P 15/36; B23P 19/022; B23P 19/04; B23P 19/10
See application file for complete search history.

(56) References Cited

U.S. PATENT DOCUMENTS 4,003,119 A * 1/1977 Hugh ................. B25D 1/16
29/254
5,276,951 A * 1/1994 Gluszek ............ B25B 27/062
29/265

(Continued)

FOREIGN PATENT DOCUMENTS

AU 730179 B2 3/2001
CN 1723068 A 1/2006
(Continued)

OTHER PUBLICATIONS

Korean Office Action (and English translation thereof) dated Jun. 19, 2015, issued in counterpart Korean Application No. 10-2014-7016740.

(Continued)

*Primary Examiner* — Monica Carter
*Assistant Examiner* — Seahee Yoon
(74) *Attorney, Agent, or Firm* — Holtz, Holtz & Volek PC

(57) ABSTRACT

A filter remover removes a cylindrical filter element housed in a housing through an opening provided in the housing. The filter remover includes: an attachment portion provided with a screw to be screwed onto the opening; an insert portion that includes a base end integrated with the attachment portion and a tip end in a form of a free end, that is elastically deformable in a radial direction orthogonal to an axial direction of the filter element in conjunction with a movement in the axial direction caused when the attachment portion is screwed, and that is inserted through the opening into a center hole provided in the filter element as the attachment portion is screwed; and an engaging portion that is provided at the tip end and that is engaged with the filter element after the attachment portion is moved for a predetermined amount when the attachment portion is screwed.

7 Claims, 4 Drawing Sheets

(56) References Cited

U.S. PATENT DOCUMENTS

| | | | |
|---|---|---|---|
| 5,966,793 A | 10/1999 | Pyron et al. | |
| 2006/0011534 A1 | 1/2006 | Hagashihara | |
| 2009/0301950 A1 | 12/2009 | Weindorf et al. | |
| 2010/0233901 A1* | 9/2010 | Wild | H01R 13/6277 439/578 |
| 2012/0199522 A1 | 8/2012 | Weindorf et al. | |

FOREIGN PATENT DOCUMENTS

| | | |
|---|---|---|
| CN | 203060958 U | 7/2013 |
| CN | 203245786 U | 10/2013 |
| DE | 202007017614 U1 | 4/2009 |
| EP | 1008375 A1 | 6/2000 |
| JP | 11221777 A | 8/1999 |
| JP | 2000500396 A | 1/2000 |
| JP | 2000176217 A | 6/2000 |
| JP | 2010019206 A | 1/2010 |
| KR | 200406855 Y1 | 1/2006 |
| KR | 1020070068591 A | 7/2007 |
| WO | 9719737 A1 | 6/1997 |

OTHER PUBLICATIONS

German Office Action dated Mar. 16, 2015, issued in counterpart German Application No. 11 2013 000 309.0.

International Search Report (ISR) dated Mar. 25, 2014 issued in International Application No. PCT/JP2013/084761.

Chinese Office Action (and English translation thereof) dated Sep. 25, 2015, issued in counterpart Chinese Application No. 201380004291.5.

International Preliminary Report on Patentability (IPRP) including Written Opinion (and English translation thereof) dated Jun. 28, 2016, issued in counterpart International Application No. PCT/JP2013/084761.

* cited by examiner

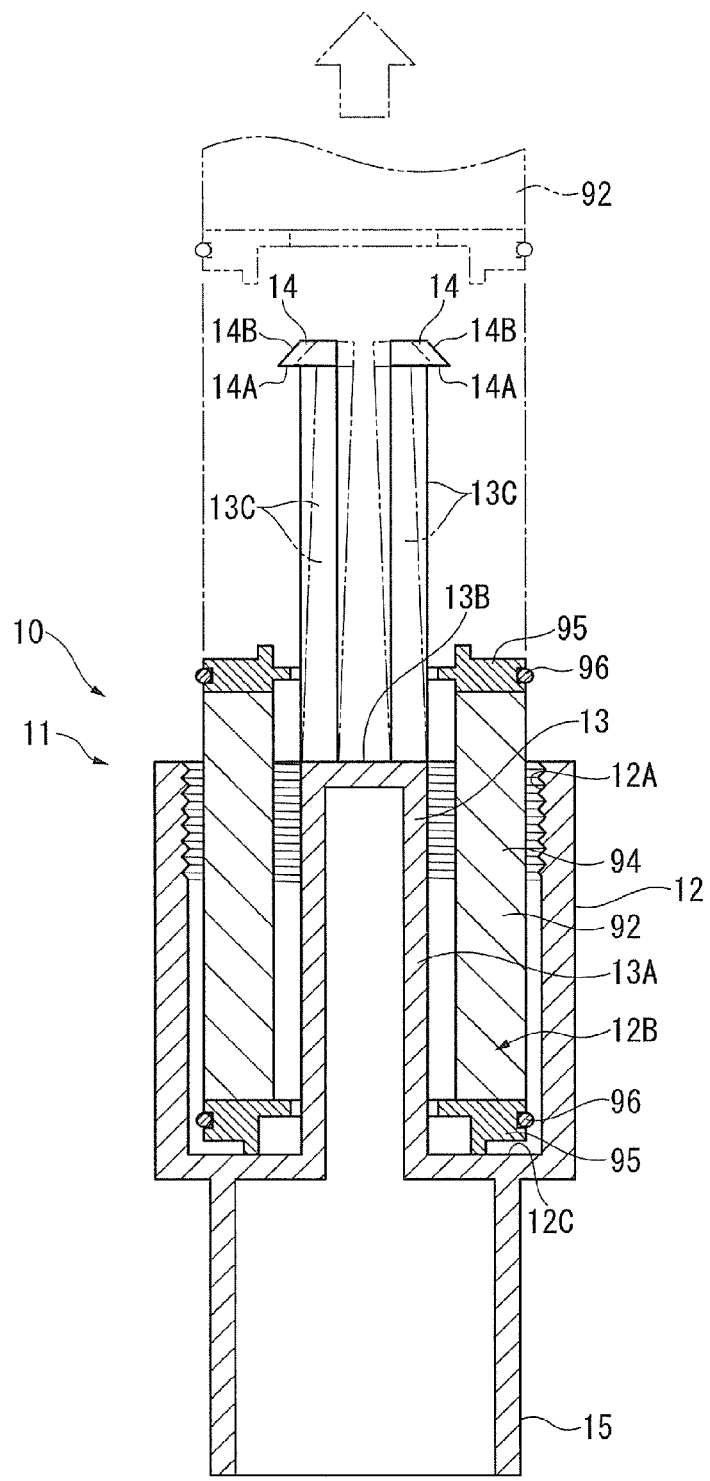

FILTER REMOVER

TECHNICAL FIELD

The present invention relates to a filter remover.

BACKGROUND ART

An exhaust gas aftertreatment device including a reduction catalyst that uses ammonia (a reduction-causing agent) obtained from a urea aqueous solution has been typically known for purifying exhaust gas from an internal combustion engine such as a diesel engine. The urea aqueous solution is pumped from a tank to an injector and injected from the injector into an exhaust pipe on an upper stream side of the reduction catalyst, whereby the urea aqueous solution is thermally decomposed by the heat of the exhaust gas. Ammonia is obtained by the thermal decomposition and the obtained ammonia is fed to the reduction catalyst to purify nitrogen oxides in the exhaust gas.

The urea aqueous solution stored in the tank is pumped by a pressure pump. The pressure pump includes a pump body, a filter element that filtrates the urea aqueous solution, and a housing that houses the pump body and the filter element. A lower side of the housing is screwed with a cap that closes an opening for attaching/detaching the filter element.

In such a pressure pump, when the filter element needs to be replaced, the cap is unscrewed from the housing to expose the opening on the lower side of the housing. A dedicated filter remover is inserted from the opening and is engaged with the filter element. By pulling the filter remover downward, the filter element is taken out of the housing.

An operation of engaging the filter element with the filter remover is conducted without visually checking an engaging portion at an end of the filter remover, since the engaging portion is inserted inside the housing. The filter remover is configured such that the hook-shaped engaging portion is elastically deformed while being inserted into the housing and is elastically restored by being engaged with the filter element. Accordingly, the filter remover needs to be pushed into the housing against an elastic restoration force of the engaging portion, which is a great burden on an operator. Consequently, it takes time and labor to replace the filter element.

In contrast, a filter device disclosed in Patent Literature 1 has been proposed. The filter device includes: a cylindrical filter element housed in a housing; and a cap (lid) engaged with a lower end of the filter element. The filter element and the cap are integrally assembled in advance. The filter element is housed in the housing when a female screw provided on the cap is screwed on a male screw provided on the housing. When the filter element needs to be replaced, the cap is unscrewed from the housing, whereby the filter element integrated with the cap is removed. Thus, the assembled cap and filter element are simultaneously replaced. Accordingly, no filter remover is required for replacing the filter element, which reduces time and labor for the operation.

Patent Literatures 2 and 3 disclose a filter remover configured to receive oil and the like leaking out in the replacement of the filter element. With such a filter remover, the operator can be prevented from getting caught in oil.

CITATION LIST

Patent Literature(S)

Patent Literature 1: JP-A-2000-176217
Patent Literature 2: JP-A-11-221777
Patent Literature 3: JP-A-2010-19206

SUMMARY OF THE INVENTION

Problems to be Solved by the Invention

However, in the filter device disclosed in Patent Literature 1, when replacing the filter element, even the cap are thrown away together with the filter element no longer required, which entails increase in the cost of components and the maintenance cost.

Moreover, when only the filter element needs to be replaced for some reason, it is necessary to remove the filter element from the cap using a special tool, which complicates the operation.

An object of the invention is to provide a filter remover that facilitates a replacement of a filter element and allows a cap to be repeatedly usable after the replacement.

Means for Solving the Problems

According to an aspect of the invention, a filter remover for removing a cylindrical filter element housed in a housing through an opening provided in the housing includes: an attachment portion provided with a screw to be screwed around the opening of the housing; an insert portion that includes a base end integrated with the attachment portion and a tip end in a form of a free end, the insert portion being elastically deformable in a radial direction orthogonal to an axial direction of the filter element in conjunction with an movement in the axial direction caused when the attachment portion is screwed, and being inserted through the opening into a center hole provided in the filter element as the attachment portion is screwed; and an engaging portion that is provided at the tip end of the insert portion and is engaged with the filter element after the attachment portion is moved for a predetermined amount when the attachment portion is screwed.

According to the above aspect of the invention, the filter remover includes the attachment portion provided with the screw to be screwed on the housing. Accordingly, when the filter element in the housing is removed using the filter remover, it is only necessary that the attachment portion is screwed on the housing while the insert portion is inserted in the center hole of the filter element. Consequently, as the attachment portion is screwed on the housing, the insert portion can be accurately inserted into the filter element, and can be easily elastically deformed (e.g., bent) in conjunction with the movement in the axial direction when the attachment portion is screwed, so that the engaging portion at the tip end of the insert portion can be engaged with the filter element. When the attachment portion is inversely rotated in the above situation to unscrew the attachment portion from the housing, the filter element can be pulled out, which facilitates the replacement of the filter element.

In the above aspect of the invention, a cap used for closing the opening is a member separate from the filter element. Similarly to the filter element, the cap can be a component of, for instance, a pressure pump. Accordingly, the cap does not need to be replaced together with the filter element and is repeatedly usable after the replacement of the filter element.

In the above aspect of the invention, it is preferable that the insert portion has a length larger than a length of the filter element in the axial direction, and at a position of the attachment portion just before being completely screwed, a distance between an engaging surface of the engaging portion and an engaged portion that is provided near one of end surfaces of the filter element remote at a depth side from the opening is equal to or less than a movable length in the axial direction of the attachment portion when the attachment portion is screwed.

With this arrangement, the engaging portion can be reliably engaged with the engaged portion at the innermost of the filter element by properly setting the length of the insert portion of the filter remover relative to the length in the axial direction of the filter element, the distance between the engaging surface of the engaging portion and the engaged portion of the filter element when removing the filter, and a movable length of the attachment portion when the attachment portion is screwed.

In the above aspect of the invention, it is preferable that the filter remover further includes an adjusting member that is attachable/detachably attached to the insert portion and adjusts elastic deformability of the insert portion.

With this arrangement, at the time when the engaging portion of the filter remover is engaged with the filter element, and while the engaging portion is in engagement with the filter element, the adjusting member adjusts a length of a bending part of the insert portion to be shortened so that elastic deformability of the bending part is increased, whereby the insert portion is difficult to bend. In this arrangement, for instance, when pulling out the filter element from the housing by an unscrewing operation of the attachment portion, there is no fear that the engaging portion is easily bent by receiving loads thereon, thereby preventing the engaging portion from being accidentally disengaged from the filter element, so that the filter element can be reliably pulled out from the housing.

When the filter remover is removed from the filter element after the filter element is pulled out from the housing, the adjusting member is removed to adjust a length of the bending part of the insert portion to be lengthened so that the elastic deformability of the bending part is decreased, thereby easily bending the insert portion. In this arrangement, the operator can also grip the engaging portion to easily deform the insert portion in the axial direction and can readily remove the filter element from the filter remover while the insert portion is elastically deformed.

In the above aspect of the invention, it is preferable that the attachment portion includes a receiving portion that receives fluid to be filtrated by the filter element.

With this arrangement, the attachment portion is configured to have the receiving portion, for instance, by denting the entire attachment portion. Accordingly, fluid and the like leaking out when removing the filter can be received by the receiving portion, which prevents the fluid from dropping over a hand of the operator and from splashing around.

Further, depending on the depth of the receiving portion, the filter element removed from the housing can be placed inside the receiving portion, so that engaging portion can be exposed through the center hole of the filter element. Accordingly, when the filter element is removed from the filter remover, the exposed engaging portion can be easily pinched to elastically deform the insert portion in the radial direction.

In the above aspect of the invention, it is preferable that the engaging portion is engaged with an engaged portion provided near one of end surfaces of the filter element remote from the opening.

With this arrangement, the engaging portion of the filter remover is provided so as to be engaged with the filter element, specifically, the engaged portion near the end surface remote from the opening of the housing. Accordingly, the insert portion on which the engaging portion is provided can be configured to have a predetermined length considering bendability. Moreover, the tip end of the engaging portion can be easily exposed from the center hole of the filter element, so that the engaging portion can be easily pinched. For maintaining the engagement between the engaging portion and the engaged portion by making the insert portion difficult to bend, it is only necessary to adjust the elastic deformability using the aforementioned adjusting member.

According to another aspect of the invention, a filter remover for removing a cylindrical filter element housed in a housing through an opening provided in the housing includes: a screw that is screwed around the opening of the housing; an attachment portion that includes a receiving portion for receiving fluid to be filtrated by the filter element; an insert portion having a plurality of arms that includes a base end integrated with the attachment portion and a tip end in a form of a free end, the insert portion being elastically deformable in a radial direction orthogonal to an axial direction of the filter element in conjunction with an movement in the axial direction caused when the attachment portion is screwed, and being inserted through the opening into a center hole provided in the filter element as the attachment portion is screwed; an engaging portion that is provided at the tip end of the insert portion and is engaged with the filter element after the attachment portion is moved for a predetermined amount when the attachment portion is screwed; and an adjusting member that is attachably/detachably attached to the arms of the insert portion and adjusts elastic deformability of the arms, in which the insert portion has a length larger than a length of the filter element in the axial direction, and at a position of the attachment portion just before being completely screwed, a distance between an engaging surface of the engaging portion and an engaged portion that is provided near one of end surfaces of the filter element remote at a depth side from the opening is equal to or less than a movable length in the axial direction of the attachment portion when the attachment portion is screwed.

According to the aspect of the invention, the same advantage as described above can be achieved.

BRIEF DESCRIPTION OF DRAWINGS

FIG. 4 is a second illustration showing the replacement of the filter element.

DESCRIPTION OF EMBODIMENT(S)

Exemplary embodiment(s) of the invention will be described below with reference to the attached drawings.

Figure 1:
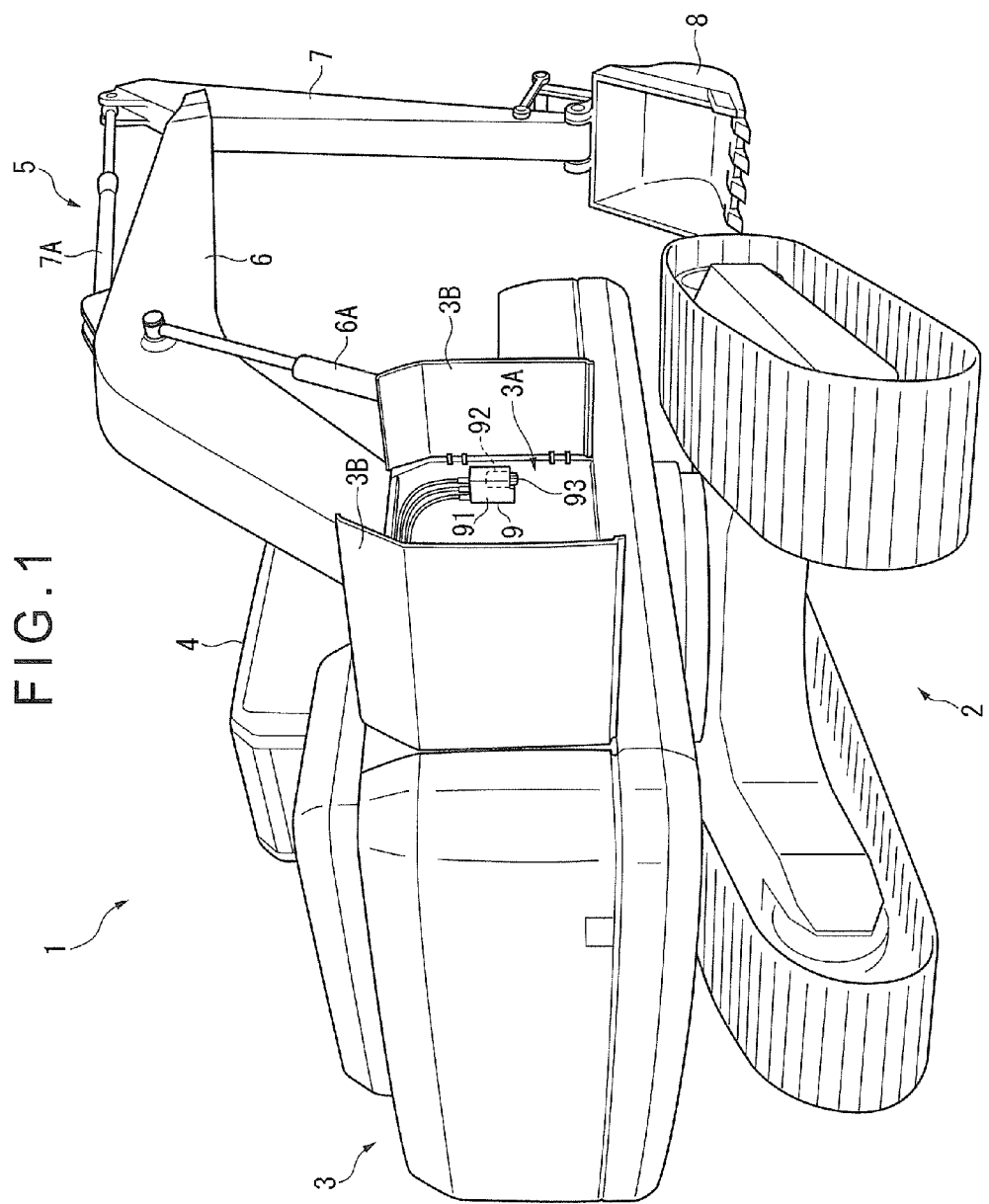
FIG. 1 is a perspective view showing a use condition of a filter element to be removed using a filter remover according to an exemplary embodiment of the invention.

FIG. 1 shows a use condition of a filter element 92 to be removed using a filter remover. The filter element 92 is housed in a pressure pump 9 that feeds a urea aqueous solution to a selective catalytic reduction device. The selective catalytic reduction device is mounted as an exhaust gas aftertreatment device in a hydraulic excavator 1 (construction machine). FIG. 1 is a view of the hydraulic excavator 1 as observed from the back toward the front.

Description of Hydraulic Excavator

The hydraulic excavator 1 includes; a crawler type undercarriage 2; an upper revolving body 3 rotatably provided on the undercarriage 2; a cab 4 provided in front-left of the upper revolving body 3; and working equipment 5 provided on the right of the cab 4. The working equipment 5 includes: a boom 6 of which base end is rotatably connected to the upper revolving body 3; an arm 7 of which base end is rotatably connected to a distal end of the boom 6; and a bucket 8 rotatably connected to a distal end of the arm 7. The boom 6, the arm 7 and the bucket 8 are respectively rotated by a boom cylinder 6A, an arm cylinder 7A and a bucket cylinder (not shown) which are hydraulic actuators.

An engine room is provided at the back side of the upper revolving body 3. In the engine room, an internal combustion engine in a form of a diesel engine (hereinafter, abbreviated as an engine) (not shown) is mounted. The engine drives a hydraulic pump, whereby the hydraulic pump feeds pressure oil to the boom cylinder 6A, the arm cylinder 7A and the bucket cylinder, and the pressure oil is fed to a hydraulic motor (a driving source) of the undercarriage 2.

In the engine room of the upper revolving body 3 in the exemplary embodiment, the aforementioned exhaust gas aftertreatment device (not shown) that purifies exhaust gas discharged from the engine is mounted. The exhaust gas aftertreatment device to be used includes: a filter device that captures PM (Particle Matter) in exhaust gas; and a selective catalytic reduction device that is disposed on a downstream side of the filter device and purifies nitrogen oxides in the exhaust gas. A reduction-causing agent used for a reduction catalyst is ammonia generated from the urea aqueous solution.

Accordingly, the upper revolving body 3 is provided with a urea water tank in which a urea aqueous solution for generating ammonia is stored. The urea water tank is disposed in a separate installation space (not shown) remote from the engine room so as to avoid thermal effects from the engine. Further, in the separate installation space 3A shielded from the engine room, there is provided a pressure pump 9 that pumps the urea aqueous solution from the urea water tank to an injector provided in an exhaust pipe. The urea aqueous solution pumped by the pressure pump 9 is injected into the exhaust pipe by the injector and is fed to the reduction catalyst together with the exhaust gas.

Figure 3:
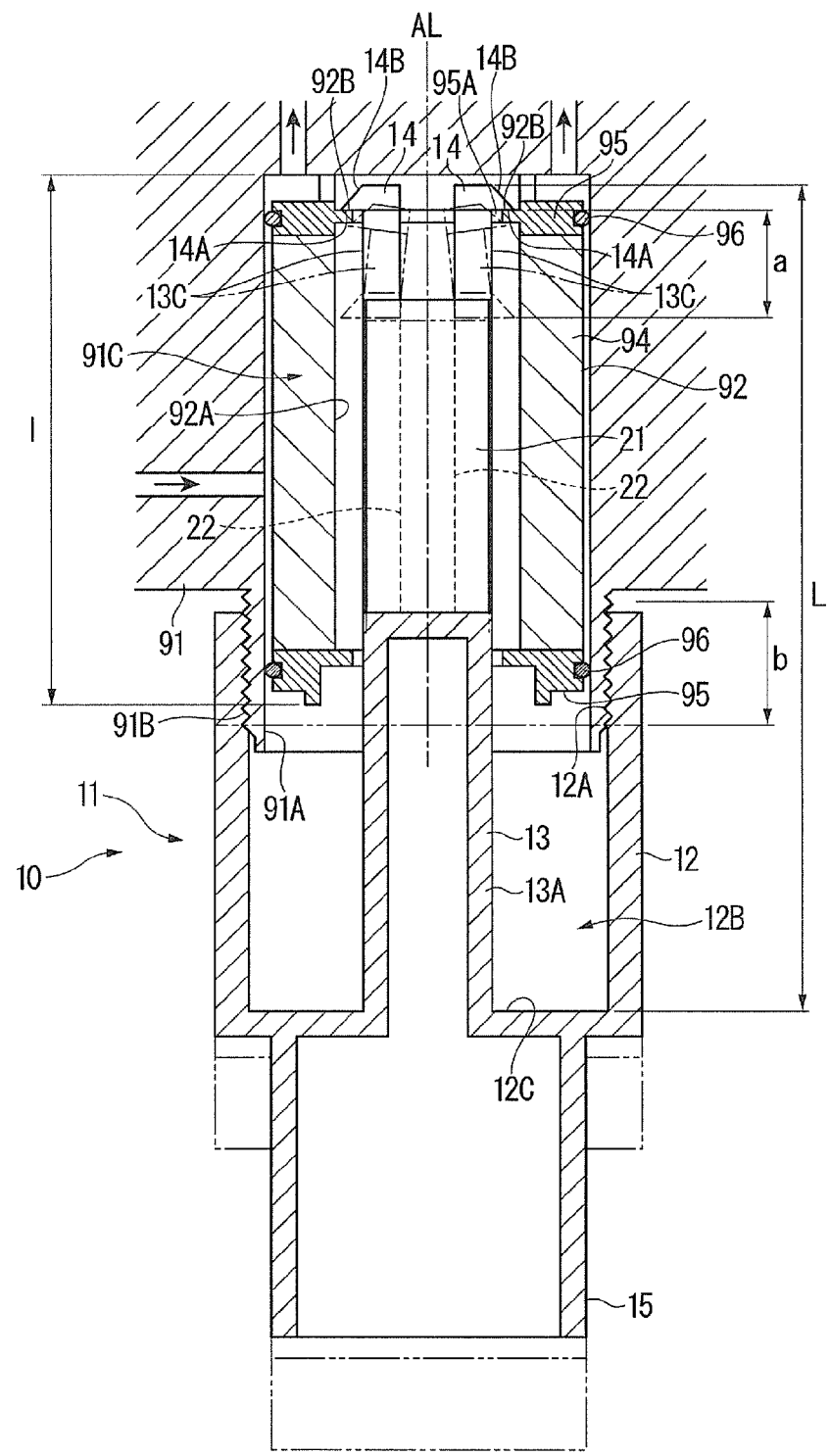
FIG. 3 is a first illustration showing a replacement of the filter element.

The pressure pump 9 includes a pump body (e.g., a vane pump) covered with a resin-made housing 91. As shown in FIG. 3, the filter element 92 that filtrates impurities mixed in the urea aqueous solution is housed in the housing 91. An opening 91A for attaching/detaching the filter element 92 is provided at a lower side of the housing 91 and is closed with a cap 93 (see FIG. 1) to be screwed on a male screw 91B formed around the opening 91A.

The filter element 92 includes: a cylindrical element carrier 94 provided by filter papers folded in bellows; and resin-made annular retainers 95 that retain each end of the element carrier 94. The filter element 92 is housed in a housing portion 91C of the housing 91 in a manner such that an axial line AL is vertical. Each of the retainers 95 is attached with an O-ring 96. The O-ring 96 is in contact with an inner surface of the housing portion 91C. With the pressing force, the filter element 92 is firmly retained in the housing portion 91C.

FIG. 3 shows a flow of the urea aqueous solution by arrows. The urea aqueous solution flowing from the urea water tank into the housing portion 91C (from the left in the figure) passes through the filter element 92 to reach a center hole 92A at the center. From the center hole 92A, the urea aqueous solution passes through an opening 95A of an upper one of the retainers 95 to flow into a space between an upper end of the filter element 92 and a ceiling surface of the housing portion 91C. A part of the urea aqueous solution is sent to the injector from the space and the rest thereof is partially returned to the urea water tank.

The filter element 92 is replaced with a new filter element after being used for a predetermined time. The replacement of the filter element 92 is performed on crawlers of the undercarriage 2 while side covers 3B,3B (FIG. 1), which cover the right side of the engine room and the installation space 3A of the upper revolving body 3, are opened. Specific procedures of the replacement will be described later. In the replacement, a resin-made filter remover 10 shown in FIGS. 2 and 3 is used.

Description of Filter Remover

Figure 2:
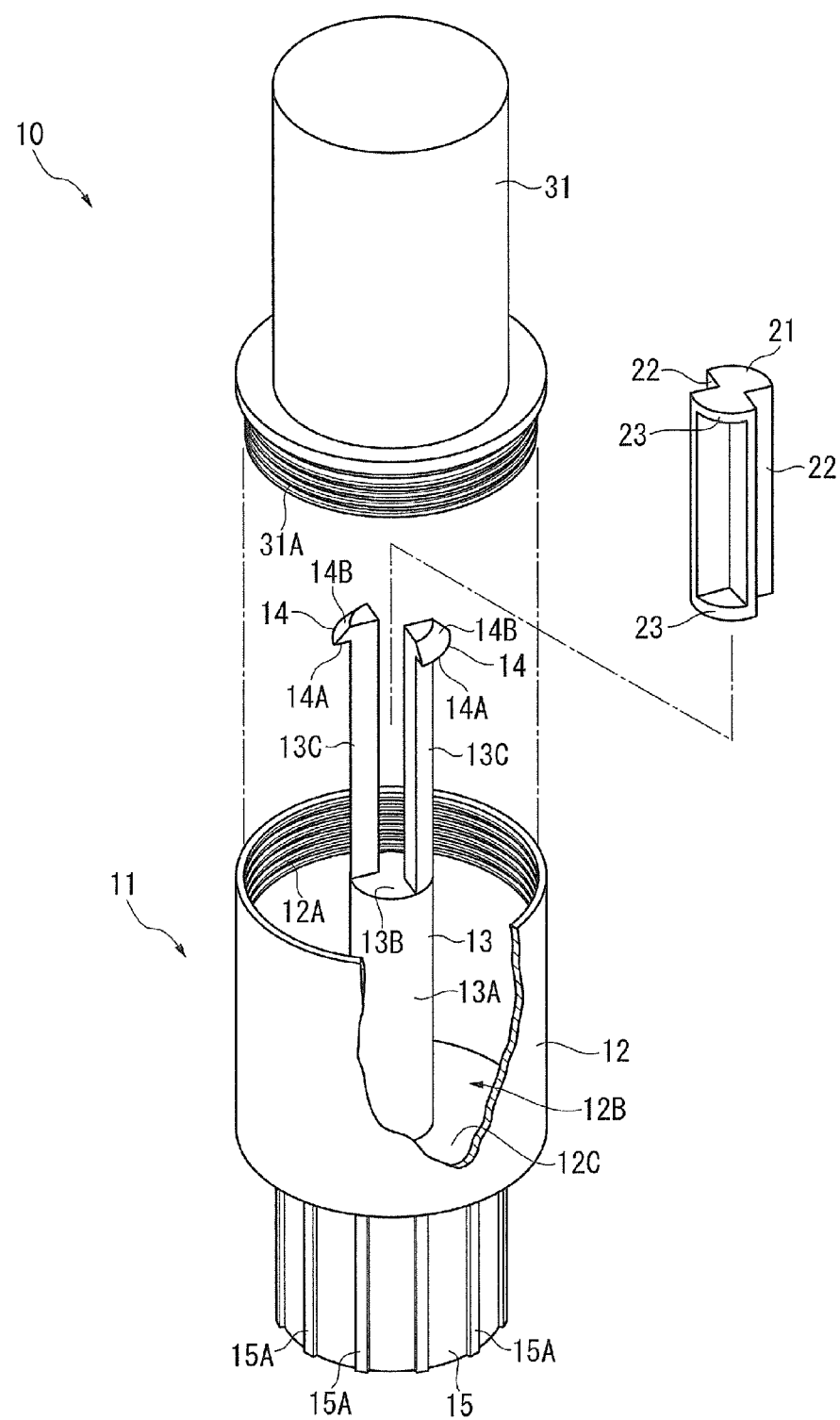
FIG. 2 is an exploded perspective view showing the entire filter remover.

In FIGS. 2 and 3, the filter remover 10 includes a tool body 11, an adjusting member 21 and a protection cover 31 which are attachably/detachably provided to the tool body 11.

The tool body 11 includes: a bottomed cylindrical attachment portion 12 that is screwed around the opening 91A of the housing 91; an insert portion 13 that includes a base end integrated with the attachment portion 12 and a tip end (free end), the insert portion being elastically deformable in a radial direction orthogonal to an axial direction of the filter element 92 when the attachment portion 12 is screwed, and being inserted into the center hole 92A of the filter element 92 through the opening 91A as the attachment portion 12 is screwed; an engaging portion 14 that is provided at a tip end of the insert portion 13 and is engaged with the filter element 92 after being moved for a predetermined amount when the attachment portion 12 is screwed; and a holding portion 15 held by the operator.

The attachment portion 12 of the tool body 11 has a female screw 12A to be screwed with a male screw 91B formed around the opening 91. The attachment portion 12 is screwed to be attached to the housing 91. The attachment portion 12 has a concave cross section having an opening toward the filter element 92 housed in the housing 91 (upward in the figure). An inner space of the concave cross section provides a receiving portion 12B that receives the filter element 92 removed from the housing 91.

The insert portion 13 includes: a column 13A that extends from the center of a bottom 12C of the attachment portion 12; and a pair of fan-shaped arms 13C,13C that extend upward from an end surface 13B of the column 13A. A tip end of each of the arms 13C is a free end. The engaging portion 14 is provided at the tip end of each of the arms 13C. On the circular end surface 13B of the column 13A, the pair of the arms 13C are juxtaposed apart from each other along a diameter direction of the end surface 13B across the axial line AL.

The engaging portion 14 projects in a direction orthogonal to the extension direction of the arms 13C. As shown in FIG. 3, the engaging portion 14 is engaged with an engaged portion 92B that is provided near the upper end surface (i.e., the end surface remote from the opening 91A) of the both end surfaces of the filter element 92 in the housing 91. More specifically, the engaging portion 14 is provided by an outward projection of an arc of the tip end of each of the cross-sectionally fan-shaped arms 13C. The engaging portion 14 includes: an engaging surface 14A to be contacted with the engaged portion 92B; and an inclined surface 14B that is inclined downward in the projecting direction of the engaging portion 14.

The engaged portion 92B serves as an inner flange of the retainer 95 of the filter element 92, the inner flange surrounding the opening 95A forming the center hole 92A.

The holding portion 15 is shaped in a cylinder having a smaller diameter than that of the attachment portion 12. A plurality of protrusions 15A extending in parallel to the axial direction are provided on an outer circumferential surface of the holding portion 15. The protrusions 15A prevents slipping and improves operability of the holding portion 15 held and operated by the operator.

As shown in FIG. 3, in the exemplary embodiment, a length L from the base end to the tip end of the insert portion 13 in the axial direction in the tool body 11 is longer than a length l of the filter element 92 in the axial direction (L≥l). As shown by a two-dot chain line in FIG. 3, at a position of the attachment portion 12 just before being completely screwed, a distance a defined between the engaging surface 14A of the engaging portion 14 and the engaged portion 92B of the filter element 92 is equal to or less than a movable length b for the attachment portion 12 to be screwed in the axial direction (b≥a). With this arrangement, by screwing the attachment portion 12 onto the housing 91 and moving the attachment portion 12 in the axial direction for the distance a or more in the range of the movable length b, the engaging portion 14 can be reliably engaged with the engaged portion 92B at the depth side.

The adjusting member 21 is shaped in a column having a predetermined length. A diameter of the adjusting member 21 is the same as that of the column 13A of the insert portion 13. A length of the adjusting member 21 is shorter than a length of the arm 13C, specifically, approximately three fourths of the length of the arm 13C. A pair of slits 22, 22 are provided continuously in the axial direction on an outer circumference of the adjusting member 21. The slits 22 are mutually spaced in a diameter direction of the adjusting member 21. Each of the slits 22 in a planar view is shaped in the same form of a fan as the cross section of the arm 13C. In other words, the adjusting member 21 is inserted into between the arms 13C while the arms enter the slits 22 (see FIG. 3). The rest part of the adjusting member 21 other than the slits 22 is dented with a flange 23 remaining at each end of the adjusting member 21. However, such a dent is not essential.

The protection cover 31 is a topped cylinder and has a male screw 31A on a lower outer circumference. By screwing the male screw 31A with the female screw 12A of the attachment portion 12, the protection cover 31 can be attached to the tool body 11. The protection cover 31 is attached to the tool body 11 with the adjusting member 21 inserted between the arms 13C to provide the filter remover 10. The filter remover 10 is stored in a predetermined place in the cab 4 or on the upper revolving body 3.

Description of Replacement of Filter Element

Replacement of the filter element 92 will be described below with reference to FIGS. 2 to 4.

The filter remover 10 is initially taken out of the storage place and the protection cover 31 is removed from the tool body 11. The adjusting member 21 remains between the arms 13C.

The cap 93 is unscrewed from the pressure pump 9. A part of the urea aqueous solution remaining in the housing portion 91C, which is accumulated in the cap 93, is removed without leaking by unscrewing the cap 93.

Next, the insert portion 13 of the tool body 11 is inserted into the center hole 92A of the filter element 92 through the opening 91A of the housing 91, whereby the female screw 12A provided on the attachment portion 12 of tool body 11 is screwed with the male screw 91B of the housing 91. The female screw 12A is kept screwed with the male screw 91B by rotating the holding portion 15, thereby moving the tool body 11 upward in the axial direction.

As shown by the two-dot chain line in FIG. 3, the inclined surface 14B formed on the engaging portion 14 of the tool body 11 is brought into contact with an inner edge of the opening 95A of the retainer 95 forming the filter element 92. As the screwing between the female screw 12A and the male screw 91B progresses, the pair of arms 13C are bent to approach each other in a radial direction. At this time, since the arms 13C are used with the adjusting member 21 in contact with the end surface 13B of the column 13A, extremely short areas of the arms 13C that project upward beyond an upper end (fulcrum) of the adjusting member 21 are bent at the upper end of the adjusting member 21.

Since the arms 13C are bent in the extremely short areas, a sufficient external force comparable with a large elastic force of the arms 13C are required for bending the arms 13C in the radial direction. In the exemplary embodiment, such an external force is generated on the contact part between the inclined surface 14B and the inner edge of the opening 95A by the progress of the screwing of the attachment portion 12, thereby easily bending the arms 13C.

Further, when the attachment portion 12 is kept being screwed and reaches a point shown by the solid line in FIG. 3, the inner edge of the opening 95A is out of contact with the inclined surface 14B, whereby the force acting on the arms 13C is instantly released, so that the arms 13C are elastically restored to engage the engaging surface 14A of the engaging portion 14 with the engaged portion 92B. In this engagement, since the bent arms 13C are vigorously elastically restored, an engaging click sound is generated. The operator can check a firm mutual engagement by hearing the engaging sound.

Subsequently, the holding portion 15 is rotated in an inverse direction to unscrew the attachment portion 12 from the housing 91, thereby moving the tool body 11 downward in the axial direction. In this downward movement, although the external force for bending the pair of arms 13C in the mutually approaching direction acts on the arms 13C, the arms 13C are not easily bent and reliably maintained since the engagement between the engaging portion 14 and the engaged portion 92B is established by a contact between the surfaces orthogonal to the downward movement. In accordance with the downward movement of the tool body 11, the filter element 92 is pulled out of the housing portion 91C. After tool body 11 is moved to a point where the attachment portion 12 is totally unscrewed from the housing 91, the filter element 92 is removed from the housing 91 by pulling the tool body 11 downward.

After the filter element 92 is removed from the housing 91, as shown in FIG. 4, the filter element 92 falls and is received in the cross-sectionally concave receiving portion 12B provided in the attachment portion 12. Although the removed filter element 92 is soaked with a urea aqueous solution, since the filter element 92 is received in the receiving portion 12B, there is no fear that the urea aqueous solution dropping from the filter element 92 adheres on the operator. Moreover, the urea aqueous solution splashing around when pulling the filter element 92 out of the housing 91 and the urea aqueous solution accumulated in the housing portion 91C instead of flowing in the cap 93 can also be received by the receiving portion 12B.

Subsequently, in FIG. 4, the filter element 92 is moved closer to the receiving portion 12B to cause the pair of arms 13C to project from the filter element 92, where the adjusting member 21 (FIGS. 2 and 3) is pulled to be removed from between the arms 13C. Then, the pair of arms 13C are bent, for instance, by gripping the engaging portions 14, toward the center (the axial line AL) in a mutually approaching manner, as shown by the two-dot chain line. At this time, since the adjusting member 21 is not present, the arms 13C can be easily bent from the base end thereof by a small force. While the arms 13C are bent to make the engaging portions 14 close to each other such that the engaging portions 14 pass through the opening 95A provided in the retainer 95 of the filter element 92, the filter element 92 is moved as shown by the two-dot chain arrow and removed from the tool body 11. The removed filter element 92 is thrown away and the used filter remover 10 is returned to the original storage place.

In the pressure pump 9, a new filter element is inserted into the housing portion 91C of the housing 91 through the opening 91A and the opening 91A is closed using the removed cap 93 again.

Replacement of the filter element 92 is completed by the above operations.

The invention is not limited to the above-described exemplary embodiment, but includes modifications and improvements as long as the objects of the invention can be achieved.

For instance, in the above exemplary embodiment, the adjusting member 21 is attachable to and detachable from the arms 13C. However, the adjusting member 21 may be interposed between the arms 13C and be movable in an extending direction of the arms 13C, thereby adjusting elastic deformability of the arms 13C.

In the above exemplary embodiment, a pair of the arm 13C are provided. However, a single arm 13C or three or more arms 13C may be provided.

In the above exemplary embodiment, the engaging portion 14 is engaged with the engaged portion 92B near the end of the filter element 92 remote from the opening 91A. However, the engaging portion 14 may alternatively be engaged with an engaged portion near an end of the filter element 92 close to the opening 91A.

In this arrangement, the length L of the insert portion 13 from the base end to the tip end is preferably larger than the length l of the filter element 92 in the axial direction by ensuring a sufficient depth of the receiving portion 12B. With this arrangement, a sufficient length of the arm 13C can be ensured and the arm 13C can be projected by a requisite length from the end of the filter element 92 while the filter element 92 is dropped in the receiving portion 12B, thereby facilitating gripping the engaging portions 14 and attaching/detaching the adjusting member 21.

The invention claimed is:

1. A filter remover for removing a cylindrical filter element housed in a housing through an opening provided in the housing, the filter remover comprising:
    an attachment portion provided with a screw that is sized to be screwed around the opening of the housing, wherein the screw is a female screw that is provided on an inner circumferential portion of the attachment portion, and wherein the attachment portion is configured to move in an axial direction of the filter element when the attachment portion is screwed around the opening by rotating the attachment portion;
    an insert portion that comprises a base end integrated immovably with the attachment portion and a tip end in a form of a free end, wherein the tip end comprises a plurality of arms, wherein the insert portion is elastically deformable in a radial direction orthogonal to the axial direction of the filter element in conjunction with the movement of the attachment portion in the axial direction, and wherein the insert portion is insertable through the opening into a center hole provided in the filter element as the attachment portion is screwed;
    an engaging portion that is provided at the tip end of the insert portion and that is adapted to engage with the filter element after the attachment portion is moved for a predetermined amount when the attachment portion is screwed; and
    an adjusting member that is detachably attachable to the insert portion by being inserted between the plurality of arms to adjust the elastic deformability of the insert portion.

2. The filter remover according to claim 1, wherein:
    the insert portion has a length larger than a length of the filter element in the axial direction; and
    at a position of the attachment portion just before being completely screwed, a distance between an engaging surface of the engaging portion and an engaged portion that is provided near one of end surfaces of the filter element remote at a depth side from the opening is equal to or less than a movable length in the axial direction of the attachment portion when the attachment portion is screwed.

3. The filter remover according to claim 1, wherein the attachment portion comprises a receiving portion that receives fluid to be filtrated by the filter element.

4. The filter remover according to claim 1, wherein the engaging portion is engaged with an engaged portion provided near one of end surfaces of the filter element remote from the opening.

5. The filter remover according to claim 1, wherein the adjusting member has a plurality of slits that are provided in an extending direction of the plurality of arms so that the plurality of arms respectively enter the plurality of slits of the adjusting member.

6. A filter remover for removing a cylindrical filter element housed in a housing through an opening provided in the housing, the filter remover comprising:
    an attachment portion that comprises a receiving portion for receiving fluid to be filtrated by the filter element;
    a screw that is sized to be screwed around the opening of the housing, wherein the screw is a female screw that is provided on an inner circumferential portion of the attachment portion, and wherein the attachment portion is configured to move in an axial direction of the filter element when the screw is screwed around the opening by rotating the attachment portion;

an insert portion having a plurality of arms that comprises a base end integrated immovably with the attachment portion and a tip end in a form of a free end, the insert portion being elastically deformable in a radial direction orthogonal to the axial direction of the filter element in conjunction with the movement in the axial direction, and being insertable through the opening into a center hole provided in the filter element as the attachment portion is screwed;

an engaging portion that is provided at the tip end of the insert portion and that is adapted to engage with the filter element after the attachment portion is moved for a predetermined amount when the attachment portion is screwed; and an adjusting member that is detachably attachable to the insert portion by being inserted between the plurality of arms to adjust the elastic deformability of the insert portion, wherein:

the insert portion has a length larger than a length of the filter element in the axial direction; and at a position of the attachment portion just before being completely screwed, a distance between an engaging surface of the engaging portion and an engaged portion that is provided near one of end surfaces of the filter element remote at a depth side from the opening is equal to or less than a movable length in the axial direction of the attachment portion when the attachment portion is screwed.

7. The filter remover according to claim 6, wherein the adjusting member has a plurality of slits that are provided in an extending direction of the plurality of arms so that the plurality of arms respectively enter the plurality of slits of the adjusting member.

* * * * *